US007238290B2

(12) United States Patent
Rawat et al.

(10) Patent No.: US 7,238,290 B2
(45) Date of Patent: Jul. 3, 2007

(54) CATALYTIC OXIDATION OF PEROXY SALTS

(75) Inventors: Nidhi Rawat, Atlanta, GA (US); David Purdy, Decatur, GA (US); Thomas M. Lachocki, Duluth, GA (US)

(73) Assignee: BioLab, Inc., Lawrenceville, GA (US)

( * ) Notice: Subject to any disclaimer, the term of this patent is extended or adjusted under 35 U.S.C. 154(b) by 11 days.

(21) Appl. No.: 10/513,651

(22) PCT Filed: May 7, 2003

(86) PCT No.: PCT/US03/14246

§ 371 (c)(1), (2), (4) Date: Nov. 5, 2004

(87) PCT Pub. No.: WO03/095361

PCT Pub. Date: Nov. 20, 2003

(65) Prior Publication Data

US 2005/0147691 A1 Jul. 7, 2005

Related U.S. Application Data

(60) Provisional application No. 60/377,968, filed on May 7, 2002.

(51) Int. Cl.

| | |
|---|---|
| ***C02F 1/72*** | (2006.01) |
| ***C01B 15/06*** | (2006.01) |
| ***C01B 15/08*** | (2006.01) |
| ***C01B 11/06*** | (2006.01) |

(52) U.S. Cl. ...................... 210/759; 210/758; 210/763; 210/764; 210/753; 210/754; 210/755; 210/756; 252/186.43; 252/186.33; 252/186.21; 252/187.24

(58) Field of Classification Search ........... 252/186.21, 252/186.33, 186.43, 187.24; 210/753, 754, 210/755, 756, 758, 759, 763

See application file for complete search history.

(56) References Cited

U.S. PATENT DOCUMENTS

| | | | |
|---|---|---|---|
| 3,953,545 | A | 4/1976 | Stoy |
| 4,007,262 | A | 2/1977 | Bowers |
| 5,373,025 | A | 12/1994 | Gay |
| 5,478,482 | A | 12/1995 | Jones et al. |
| 6,120,698 | A | 9/2000 | Rounds et al. |

*Primary Examiner*—Joseph D. Anthony
(74) *Attorney, Agent, or Firm*—Smith, Gambrell & Russell

(57) ABSTRACT

Transition metal ions have the ability to increase the oxidation performance of the inorganic peroxy salts at room temperature by possibly lowering their activation energy or by producing more reactive free radicals. When two transition metal salts are used together to decompose dipersulfate, it provides synergistic oxidation activity, better than obtained by dipersulfate or dipersulfate with either copper or zinc alone. The transition metals mentioned are the water soluble salts of copper and zinc. Oxidation performance of sodium dipersulface in presence of catalytic amount of copper and zinc salts was determined by measuring the destruction of crystal violet dye at a wavelength of 589 nm.

14 Claims, 3 Drawing Sheets

Constant: DPS 1

Effect of Copper Sulfate On Oxidation Performance Of DPS

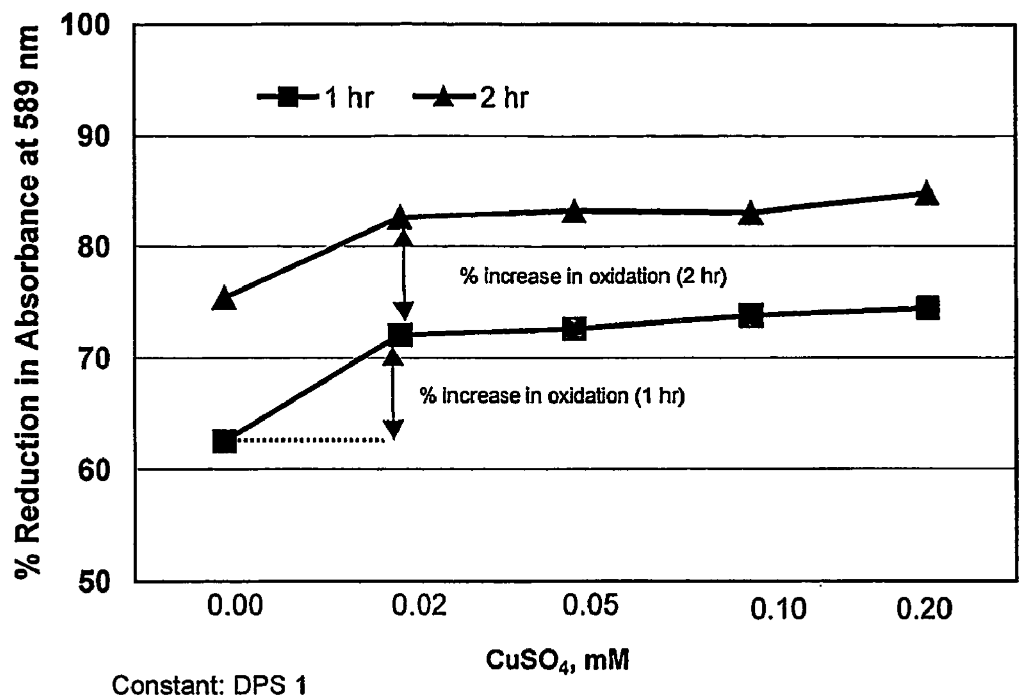
Figure 1: Effect of Copper Sulfate On Oxidation Performance Of DPS
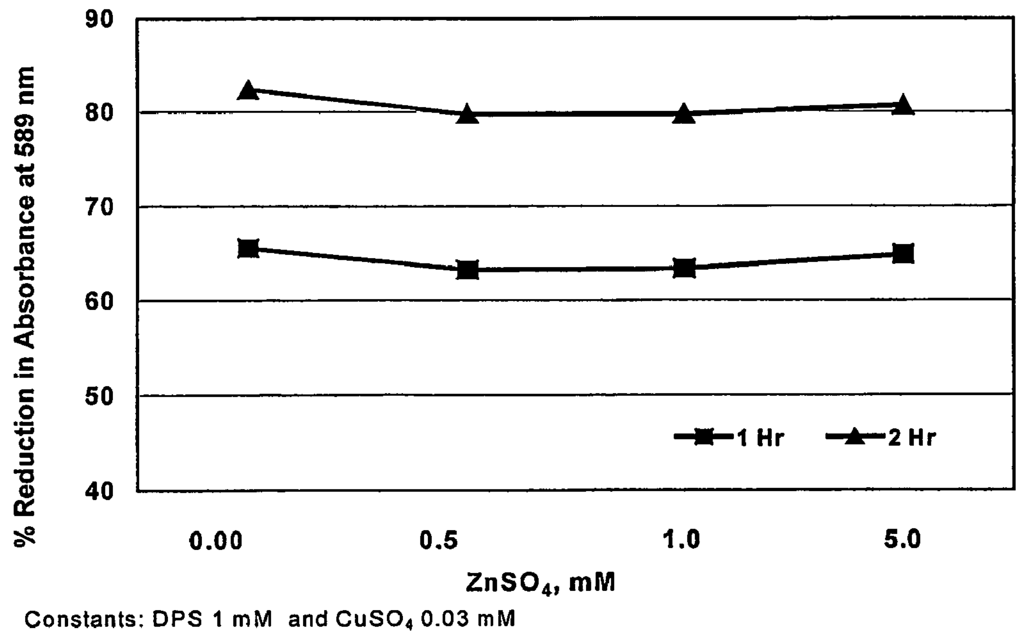
Figure 2: Effect of Zinc Sulfate On Oxidation Performance Of DPS

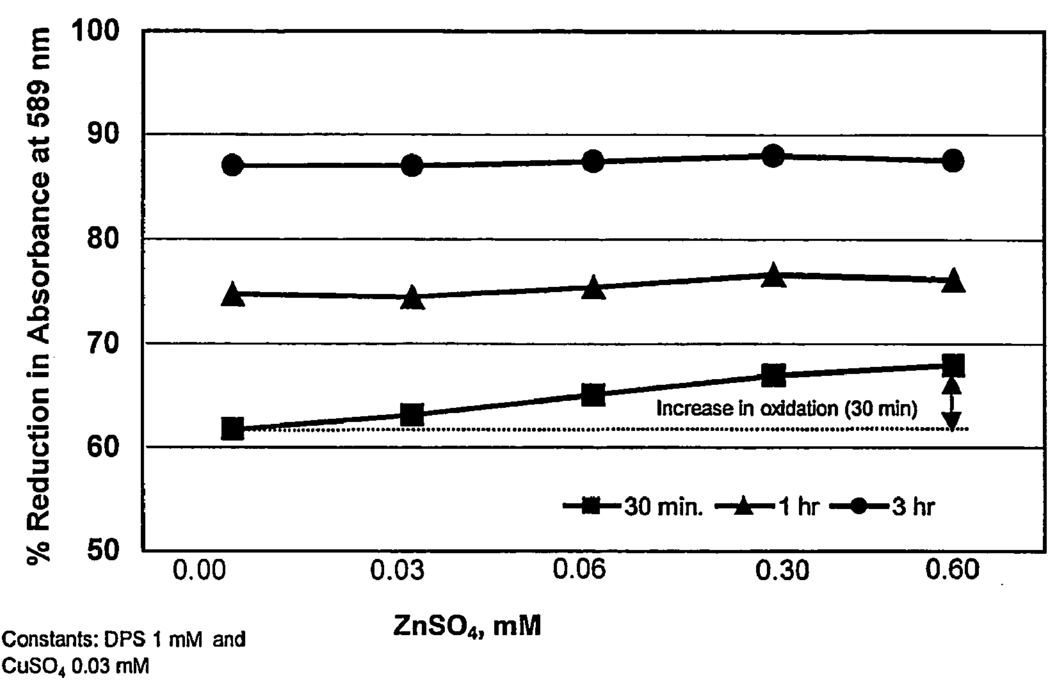
Figure 3: Synergistic Effect of Copper Sulfate and Zinc Sulfate On Oxidation Performance Of DPS

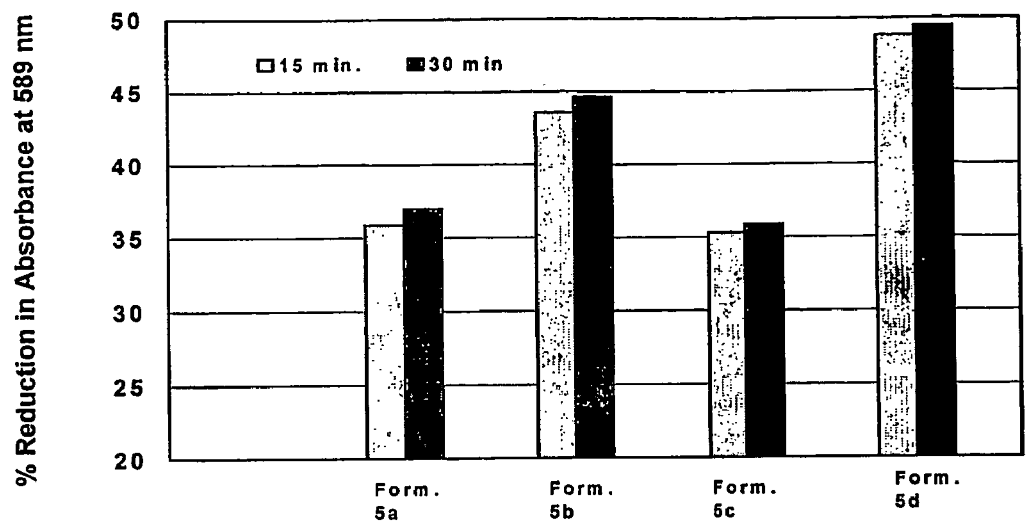
Figure 4: Effect of Metal Salts On Oxidation Performance of Multi-Component Water Treatment Formulations
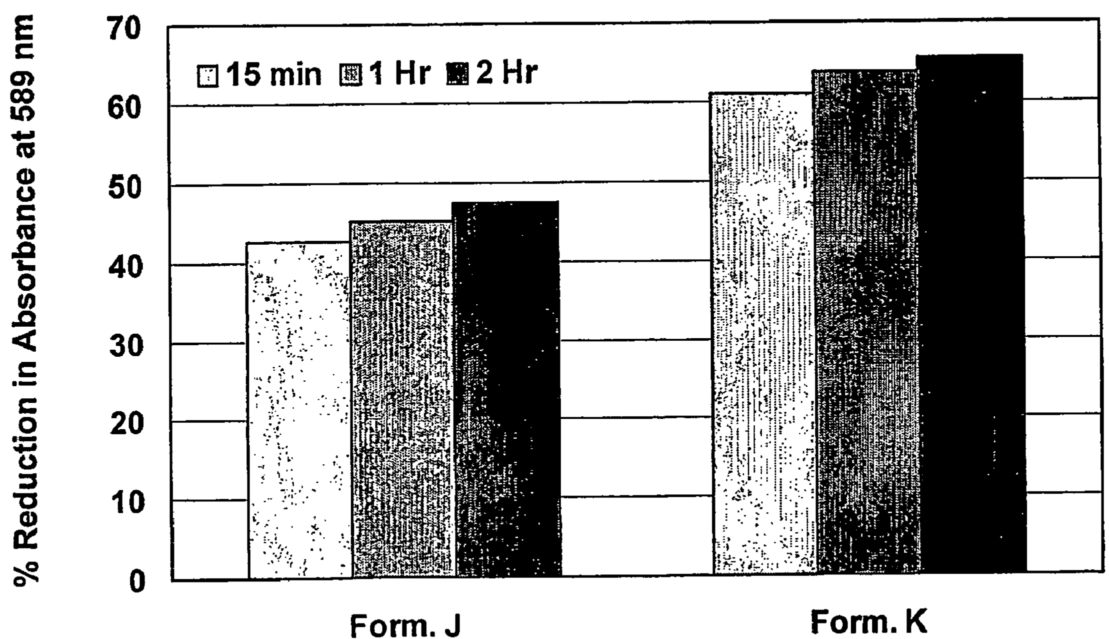
Figure 5: Effect of Copper Sulfate and Copper Sulfate + Zinc Sulfate On Oxidation Performance of Multi-Component Water Treatment Formulations

CATALYTIC OXIDATION OF PEROXY SALTS

REFERENCE TO A RELATED APPLICATION

The present application claims the benefit of the provisional patent application 60/377,968 filed May 7, 2002, which is relied on and incorporated herein by reference.

FIELD OF INVENTION

The present invention relates generally to a method and composition for treatment of water system to inhibit microbial and algal growth. In particular, this invention relates to metal activated non-chlorine oxidizer based composition with or without a chlorine oxidizer, a clarifier and a biocide to treat water body. More particular, the invention relates to treatment of water systems such as swimming pools, spas, hot tubs, cooling water or any water body that is subject to the growth of micro-organisms.

INTRODUCTION AND BACKGROUND

Many water use applications like swimming pools, spas, hot tubs, cooling towers, process water, and the like, require a constant residual of biocide chemicals to control bacterial and algal populations, in order to have sanitary water safe for the users, operators, and service personnel. Typical organisms that will grow in the water in such systems include Chlorococcum, Chlorella, Cledaphora, Microcystis, Oscilratoris, Spirosyra, Olaothrisx, Vanetteria, and *Aspergilles flavus.* The prevention or inhibition of growth of these micro-organisms in water systems has been a problem.

It is customary to treat water systems with one or more sanitizers and/or sanitizer/oxidizer combinations to control the growth of micro-organisms. The sanitizers most commonly used to control the growth of micro-organisms are chemicals that generate hypochlorite or hypobromite species when dissolved in water. There are many hypochlorite generating chemicals, with the more common ones being chlorine gas, alkali metal hypochlorites such as sodium hypochlorite, alkaline earth metal hypochlorites such as calcium hypochlorite and lithium hypochlorite, halogenated hydantoins and chlorinated isocyanuric acid derivatives such as sodium or potassium dichloro-s-triazinetrione.

The most common sanitizers that are used in applications that directly contact people (swimmers, waders, or bathers, etc) are oxidizing sanitizers that release hypochlorous acid (chlorine) into the water. It is common practice to periodically "shock" or "oxidize" the water by adding a significant amount of an oxidizing chemical to water to destroy inorganic and organic contaminants. Shock products are largely solid products. In some cases, chlorine- or halogen-releasing products are periodically used to oxidize contaminants, shock and kill bacteria and algae.

It is highly desirable to have multi-functional oxidizer or shock products for use in water treatment applications. Examples of such patented technology relating to mixtures of a chlorine source, a non-halogen oxidizer source, and other additives are Pat. Nos. 5,478,482, 5,514,287, and 5,670,059. The research disclosed in these patents show a synergy between sodium dipersulfate and sodium dichloro-s-triazinetrione.

Prior art teaches that the oxidation performance of sodium dipersulfate compound is greatly dependent on temperature. It is more effective when the temperature is at or above 60° C. and experience a decreased reactivity at the lower temperatures.

Although, the prior patent indicates that blends of sodium dipersulfate and dichloro-s-triazinetrione have superior oxidization properties when compared to the individual components, it is desirable to further improve the oxidation properties of sodium dipersulfate in the formulations with dichloro-s-triazinetrione especially at ambient temperatures.

Since the swimming pool water temperature is generally ambient, a large quantity of peroxy compound will have to be used to provide the desired benefits. The dependence of peroxy compound on temperature and concentration is practically and economically significant. As a consequence, there is much interest in catalyzing or activating peroxy compounds, which will increase the oxidation performance of these compounds by allowing them to be effective at ambient temperatures. Such substances are generally referred to in this art as catalysts or peroxy compound catalysts or activators.

U.S. Pat. No. 3,702,298, issued to Zsoidos et al. on Nov. 7, 1972, teaches a method for treating swimming pools with a combination of a peroxy salt, such as peroxymonosulfuric acid and copper salt. However, no prior art teaches the use of two transition metal salts in combination to activate sodium dipersulfate oxidation.

It is, therefore, an object of this invention to provide an improved peroxy salts based formulation catalyzed by two transition metal for treatment of water system. This formulation may or may not additionally contain chlorine releasing chemicals, a clarifier and a biocide.

SUMMARY OF THE INVENTION

The present invention relates to treatment of water including swimming pool, spa, hot tubs, cooling towers, process water, etc. The invention particularly relates to improving oxidation properties to better allow oxidizing sanitizers to control the microbial growth in these water systems. In addition, since the oxidation acceleration additives may also have algistatic or algicidal functions, this discovery better teaches how to include a chemical that provides sustained algicidal properties into an oxidizer product. It has been discovered for the first time that the oxidation performance of sodium dipersulfate in presence of water soluble copper and zinc salts in combination provides synergistic oxidative activity, better than that obtained by dipersulfate or dipersulfate catalyzed by copper or zinc salts alone.

BRIEF DESCRIPTION OF THE DRAWINGS

The present invention will be further understood with reference to the accompanying drawings, wherein FIG. 1 is a graph showing the effect of copper sulfate on oxidation performance of sodium dipersulfate (DPS);

FIG. 2 is a graph showing the effect of zinc sulfate on oxidation performance of sodium dipersulfate (DPS);

FIG. 3 is a graph showing the synergistic effect of copper sulfate and zinc sulfate on oxidation performance of sodium dipersulfate (DPS);

FIG. 4 is a graph comparing the effect of metal salts on oxidation performance of multi-component water treatment formulations; and FIG. 5 is a graph comparing the effects of copper sulfate and combination of copper sulfate+zinc sulfate on oxidation performance of multi-component water treatment formulations.

DETAILED DESCRIPTION OF INVENTION

The water treatment formulation according to the present invention can comprise a halogen source, a non-halogen oxidizer, a clarifying agent and a metal ion/s as a catalyst for non-halogen oxidizer activation. This composition may optionally contain a boron source material also.

The halogen source material can be selected from sodium or potassium dichloro-s-triazinetrione, trichloro-s-triazinetrione, calcium hypochlorite, lithium hypochlorite, brominated hydantoins and brominated glycouril.

The non-halogen oxygen donor material can be selected from the group consisting of peroxydisulfates and peroxymonosulfuric acid salts. The peroxydisulfates can include those having the formula—$N_WS_2O_8$ where N is an alkali metal or alkaline earth metal or ammonium, and w is 1 or 2. The alkali metal can include sodium, potassium or lithium. The alkaline earth metal can include calcium or magnesium. The persulfuric acid salts include such compounds as $KHSO_4.K_2SO_4$ and $2KHSO_5$ for example OXONE™.

The catalyst source for the non-halogen oxidizer is selected from water-soluble salts of copper and zinc ion donors. The source of copper ion is a soluble salt, such as, copper sulfate, copper chloride, copper nitrate, copper bromide, copper flouride, copper metaborate, copper oxalate, copper acetate, copper citrate, copper gluconate, copper formate, copper salicylate, copper ammonium sulfate or mixture of these with each other or with other copper salts The zinc ion can be provided by any water soluble zinc salts, such as, zinc sulfate (mono and heptahydrate), zinc chloride, zinc nitrate, zinc bromide, zinc flouride, zinc iodide, zinc borate, zinc acetate, zinc citrate, zinc formate, zinc oxalate, zinc salicylate, zinc lactate or mixture of these with each other or with other zinc salts or any respective hydrates.

The clarifier material source can be sodium aluminum sulfate or other chemicals used to treat the water system.

The optional boron source material may be any suitable compound or mixture, such as, disodium tetraborate decahydrate, disodium tetraborate pentahydrate, disodium tetraborate tetrahydrate, disodium octaborate tetrahydrate, sodium pentaborate pentahydrate, sodium metaborate tetrahydrate, sodium metaborate bihydrate, dipotassium tetraborate tetrahydrate, potassium pentaborate tetrahydrate, diammonium tetraborate tetrahydrate and ammonium pentaborate tetrahydrate. The optional boron source material may also be selected from the group consisting of boric acid, boric oxide (anhydrous boric acid) and compounds having the formula $M_NB_XO_Y.ZH_2O$, in which M=sodium, potassium, calcium, magnesium or ammonium, n=1 to 3, X=any whole number from 2 to 10, y=3x/2+1, z=0 to 14.

The water treatment composition comprises preferably 50 to 70%; more preferably 55 to 65%, of halogen source material. The non-halogen oxygen donor source is preferably 5 to 40%, more preferably 8 to 25% of the composition, the boron source preferably constitutes 0 to 20%, more preferably 0 to 10%, and the clarifier source is preferably 0 to 20%, more preferably 5 to 15%. The copper ion source is preferably 0.1 to 10%, more preferably 0.5 to 5% and zinc ion source is preferably 0.5 to 20%, more preferably 2 to 10%.

The invention is better understood using the following examples. However these examples are not to be interpreted as limiting the invention in any way. This invention is discussed in two parts—the first part contains examples of peroxy salt catalysis by metal salts, and the second part contains examples of formulations containing peroxy salt, metal salt/s, chlorine oxidizer, clarifier and biocide.

I. Oxidation Performance of Sodium Dipersulfate

The following examples illustrate the oxidation performance of sodium dipersulfate in the presence of transition metal salts, monitored by change in crystal violet dye solution color. All experiments were carried at ambient temperature.

The oxidation performance of the oxidizer or oxidizer based formulations was determined by fading of the crystal violet dye solution color. The fading of the color was monitored by measuring the UV absorbance of the dye solution at 589 nm, before and after addition of oxidizer or oxidizer based formulation. The change in absorbance or fading of color of the dye solution, corresponds to the oxidation activity of the oxidizer. The greater the change in absorbance, more reactive is the oxidizer composition.

EXAMPLE 1

Examples 1a to 1e illustrate the effect of catalytic amount of copper sulfate pentahydrate on the oxidation performance of the sodium dipersulfate at ambient temperature. The oxidation activity was determined by measuring the destruction of crystal violet dye color at a wavelength of 589 nm by these formulations.

Stock Solutions:

Crystal Violet Dye solution: Prepare crystal violet dye solution by dissolving 5 mg of crystal violet dye in 1000 mls of deionized water. Dilute the solution accordingly to get a sharp peak at 589 nm.

Sodium Dipersulfate solution: Prepare fresh stock solution by dissolving 1 g of sodium dipersulfate in 100 mls of deionized water.

Copper Sulfate solution: Prepare fresh stock solution by dissolving 1 g of copper sulfate pentahydrate in 100 mls of deionized water.

Apparatus: HACH 4000 Spectrophotometer

Procedure:

1. Prepare stock solutions of sodium dipersulfate (DPS) and copper sulfate pentahydrate ($CuSO_4.5H_2O$) at different concentrations as shown in Table 1.
2. Into 1500 mls beaker add 1000 mls of crystal violet dye solution.
3. Using Hach spectrophotometer measure initial absorbance of the dye solution at 589 nm.
4. From the stock solution add the molar amounts of DPS and $CuSO_4$ in each beaker and allow the solution to stir for 1 and 2 hours.
5. Measure the absorbance at 589 nm after 1 and 2 hours reaction time.
6. Calculate the percent decrease in crystal violet dye absorbance at 589 nm using the formula:

$$\%\ \text{Abs.Red.} = \left\{\frac{\text{Abs}_i - \text{Abs}_f}{\text{Abs}_i} \times 100\right\}$$

Where $Abs_i$=Absorbance of crystal violet dye solution at the start of the experiment $Abs_f$=Absorbance of crystal violet dye solution at different times after addition of stock solutions The results are summarized in TABLE 1 and FIG. 1.

TABLE 1

| | Concentration, mM (milli Molar) Example | | | | |
|---|---|---|---|---|---|
| Test Compd. | 1a | 1b | 1c | 1d | 1e |
| DPS | 1.0 | 1.0 | 1.0 | 1.0 | 1.0 |
| $CuSO_4.5H_2O$ | 0.0 | 0.02 | 0.05 | 0.10 | 0.20 |
| Absorbance (at 589 nm) | | | | | |
| 0 Hr | 2.478 | 2.478 | 2.478 | 2.478 | 2.478 |
| 1 Hr | 0.929 | 0.693 | 0.679 | 0.650 | 0.633 |
| 2 Hr | 0.609 | 0.43 | 0.414 | 0.420 | 0.375 |
| % Reduction in Absorbance (at 589 nm) | | | | | |
| 0 Hr | 0.0 | 0.0 | 0.0 | 0.0 | 0.0 |
| 1 Hr | 62.5 | 72.0 | 72.6 | 73.8 | 74.5 |
| 2 Hr | 75.4 | 82.7 | 83.3 | 83.1 | 84.9 |

The results of example 1a show the oxidation performance of 1 mM solution of sodium dipersulfate in absence of copper ions. In subsequent examples 1b to 1e, dipersulfate concentration was kept constant at 1 mM while increasing the copper sulfate concentration from 0.02 mM to 0.20 mM. Under the conditions of test performed, these results indicate that the oxidation performance of sodium dipersulfate is increased in presence of a very small amount of copper sulfate after 1 and 2 hours of reaction time. Very small change in oxidation activity is observed by increasing the copper sulfate concentration as indicated by examples 1c to 1e. Based on this study it is concluded that only a small amount of copper ions from a solid copper salt material is required to increase the oxidation of sodium dipersulfate in solution.

EXAMPLE 2

In this example the effect of zinc sulfate heptahydrate on oxidation performance of sodium dipersulfate was determined by measuring the destruction of crystal violet dye color at 589 nm.

Reagents:

Crystal Violet Dye solution: Prepare stock solution as described in example 1.

Sodium Dipersulfate solution: Prepare stock solution as described in example 1.

Zinc Sulfate solution: Dissolve 10 g of Zinc Sulfate Heptahydrate in 100 mls of deionized water.

Apparatus: HACH 4000 Spectrophotometer

Procedure:

1. Prepare stock solutions as shown in Table 2
2. Follow the steps 2 to 6 as outlined in procedure for example 1.

The results are summarized in Table 2 and FIG. 2.

The results of example 2a (control) shows the oxidation of crystal violet dye solution by 1 mM sodium dipersulfate solution at ambient temperature. In the following examples 2b to 2d, concentration of zinc sulfate heptahydrate was varied from 0.5 to 5.0 mM while keeping the dipersulfate concentration constant at 1 mM. The results of example 2a to 2d indicate that zinc sulfate has no effect on the oxidation performance of sodium dipersulfate.

TABLE 2

| Test Compd. | Concentration, mM Example | | | |
|---|---|---|---|---|
| | 2a | 2b | 2c | 2d |
| DPS | 1.0 | 1.0 | 1.0 | 1.0 |
| $ZnSO_4.7H_2O$ | 0.0 | 0.5 | 1.0 | 5.0 |
| Absorbance (at 589 nm) | | | | |
| 0 Hr | 2.529 | 2.529 | 2.529 | 2.529 |
| 1 Hr | 0.871 | 0.928 | 0.927 | 0.889 |
| 2 Hr | 0.446 | 0.512 | 0.512 | 0.489 |
| % Red. Absorbance (at 589 nm) | | | | |
| 0 Hr | 0.0 | 0.0 | 0.0 | 0.0 |
| 1 Hr | 65.6 | 63.3 | 63.4 | 64.9 |
| 2 Hr | 82.4 | 79.8 | 79.8 | 80.7 |

EXAMPLE 3

In these experiments oxidation performance of the sodium dipersulfate in the presence of catalytic amount of copper sulfate pentahydrate and zinc sulfate heptahydrate was determined by measuring the destruction of crystal violet dye solution at 589 nm.

Reagents:

Crystal Violet Dye solution: Prepare stock solution as in example 1.

Sodium Dipersulfate solution: Prepare stock solution as in example 1.

Copper Sulfate solution: Prepare stock solution as in example 1.

Zinc Sulfate solution: Prepare stock solution as in example 2.

Apparatus: HACH 4000 Spectrophotometer

Procedure:

1. Prepare the solutions at different concentrations as shown in Table 3.
2. Follow the steps 2 to 6 as outlined in procedure for example 1.

The results are summarized in Table 3 and FIG. 3.

TABLE 3

| | Concentration, mM Example | | | | | |
|---|---|---|---|---|---|---|
| Test Compd. | 3a | 3b | 3c | 3d | 3e | 3f |
| DPS | 1.0 | 1.0 | 1.0 | 1.0 | 1.0 | 1.0 |
| $CuSO_4.5H_2O$ | 0.0 | 0.03 | 0.03 | 0.03 | 0.03 | 0.03 |
| $ZnSO_4.7H_2O$ | 0.0 | 0.00 | 0.03 | 0.06 | 0.30 | 0.60 |
| Absorbance (at 589 nm) | | | | | | |
| 0 Hr | 3.106 | 3.106 | 3.106 | 3.106 | 3.106 | 3.106 |
| 0.5 Hr | 1.496 | 1.189 | 1.146 | 1.085 | 1.027 | 0.996 |
| 1 Hr | 0.998 | 0.784 | 0.793 | 0.761 | 0.725 | 0.739 |
| 3 Hr | 0.483 | 0.403 | 0.391 | 0.390 | 0.371 | 0.387 |
| % Red. Absorbance (at 589 nm) | | | | | | |
| 0 Hr | 0.0 | 0.0 | 0.0 | 0.0 | 0.0 | 0.0 |
| 0.5 Hr | 51.8 | 61.7 | 63.1 | 65.1 | 66.9 | 67.9 |
| 1 Hr | 67.9 | 74.8 | 74.47 | 75.5 | 76.7 | 76.2 |
| 3 Hr | 84.5 | 87.0 | 87.4 | 87.4 | 88.1 | 87.5 |

Examples 3a to 3f demonstrate the synergistic activity of copper and zinc ions in catalyzing the oxidation of sodium dipersulfate solution at ambient temperatures. Example 3a is the control showing the oxidation performance of 1 mM solution of sodium dipersulfate. In Example 3b to 3f, sodium dipersulfate concentration was kept constant at 1 mM and copper sulfate at 0.03 mM. The zinc sulfate concentration was increased from 0.00 to 0.60 mM in these experiments. The results indicate that the copper sulfate and zinc sulfate have a synergistic effect on the oxidation performance of sodium dipersulfate. So, for example 0.3 mM of zinc sulfate along with 0.03 mM of copper sulfate (0.5 hour) provides a synergistic oxidation activity that is better than that obtained by dipersulfate alone or dipersulfate activated by copper sulfate or zinc sulfate.

II. Oxidation Performance of Formulations Containing Sodium Dipersulfate, Metal Salts, Chlorine Oxidizer, Clarifier and Biocide The following examples clearly illustrates the benefit of using two transition metal salts to increase the oxidation performance of the formulations containing sodium dipersulfate, sodium dichlor, alum and borax.

EXAMPLE 5

The oxidation performance of the four formulations 5a, 5b, 5c and 5d with or without catalytic amount of copper sulfate pentahydrate, zinc sulfate heptahydrate or copper sulfate+zinc sulfate, respectively was determined by method as described in example 1. Table 4 enlists the compositions of these example formulations that can be used in treatment of recreational water systems like swimming pools, spas etc.

TABLE 4

| Chemicals | Form 5a % | Form 5b % | Form 5c % | Form 5d % |
|---|---|---|---|---|
| Sodium dichloro-s-Triazinetrione | 55.0 | 55.0 | 55.0 | 55.0 |
| Sodium dipersulfate | 23.0 | 23.0 | 23.0 | 23.0 |
| Sodium tetra borate pentahydrate | 10.0 | 10.0 | 10.0 | 10.0 |
| Aluminum sulfate | 12.0 | 11.5 | 9.0 | 5.7 |
| Copper sulfate pentahydrate | 0.0 | 0.50 | 0.0 | 0.30 |
| Zinc sulfate heptahydrate | 0.0 | 0.0 | 3.0 | 6.0 |

1% stock solution of formulations 5a, 5b, 5c and 5d was prepared in deionized water and 0.5 mls of this stock solution was added to 1 liter of crystal violet dye solution to give 5 mg/l of product concentration. The oxidation performance of the formulations as indicated by the % decrease in absorbance at 589 nm with time is shown in FIG. 4.

The results of these experiments validates the findings documented in example 1 (1a to 1e), example 2 (2a to 2d) and example 3 (3a to 3f). Formulation 5b containing small amount of copper sulfate pentahydrate shows better oxidation than control formulation 5a, having no metal catalysts. Zinc Sulfate has no effect on the oxidation performance of the formulation as can be seen by the results of formulation 5c. However, formulation 5d containing both copper sulfate and zinc sulfate clearly shows the best oxidation performance amongst all the formulations listed in Table 4.

EXAMPLE 6

The oxidation performance of the two formulations J and K in presence of catalytic amount of copper sulfate and copper sulfate+zinc sulfate, respectively was determined by method as described in example 1. These formulations to be used in treatment of recreational water systems like swimming pools, spas etc have the compositions shown in Table 5.

TABLE 5

| Chemicals | Form. J % | Form. K % |
|---|---|---|
| Sodium dichloro-s-Triazinetrione | 65.0 | 65.0 |
| Sodium dipersulfate | 20.0 | 20.0 |
| Sodium tetra borate pentahydrate | 4.0 | 2.0 |
| Aluminum sulfate | 10.0 | 8.0 |
| Copper sulfate pentahydrate | 1.0 | 1.0 |
| Zinc sulfate heptahydrate | 0.0 | 4.0 |

1% stock solution from formulation J and K was prepared and 0.5 mls of this stock solution was added to 1 liter of crystal violet dye solution to give 5 ml/l of product concentration. The oxidation performance of the formulations as indicated by the % decrease in absorbance with time is shown in FIG. 5.

The results of these experiments clearly indicate better oxidation performance of formulation containing both copper sulfate and zinc sulfate as catalysts as compared to only copper sulfate.

Further variations and modifications of the invention will be apparent to those skilled in the art from the foregoing and are intended to be encompassed by the claims appended hereto.

What is claimed is:

1. A process for the treatment of recirculating water by adding thereto a composition comprising sodium dipersulfate, 0.5 to 5% by weight based on the composition of copper sulfate or copper citrate and 2 to 10% by weight based on the composition of zinc sulfate which provides synergistic oxidation activity in the presence of an oxidizing sanitizer.

2. The process according to claim 1, wherein the oxidizing sanitizer present in the water is a source of hypochlorous acid.

3. The process according to claim 1, wherein the combination is copper sulfate pentahydrate or copper citrate in an amount of from 0.5 to 5% by weight of the composition, and zinc sulfate heptahydrate in an amount of 2 to 10% by weight of the composition.

4. A composition of matter comprising sodium dipersulfate and copper sulfate or copper citrate and zinc sulfate, wherein the copper sulfate or citrate is present in an amount of 0.5 to 5% by weight of the composition and the zinc sulfate is present in an amount of 2 to 10% by weight of the composition.

5. A method for improving the activity of a peroxy compound in a composition containing sodium dipersulfate comprising adding to the composition an amount of copper sulfate or copper citrate and zinc sulfate to provide a composition containing from 0.5 to 5% by weight of the composition of copper sulfate or citrate, and from 2 to 10% by weight of zinc sulfate.

6. A sanitizing composition comprising a mixture of a halogen source material, sodium dipersulfate and a combination of copper and zinc transitional metal ions as a catalyst source wherein copper is present as copper sulfate or copper citrate in an amount of 0.5 to 5% by weight of the composition and zinc is present as zinc sulfate in an amount of 2 to 10% by weight of the composition.

7. The composition of claim 6, in which the halogen source material is sodium or potassium dichlor, tricolor, calcium hypochlorite and/or lithium hypochlorite.

8. The composition of claim 6, in which boron is an optional component.

9. The composition of claim 8, where a boron source material is selected from the group consisting of boric acid, boric oxide (anhydrous boric acid) and compounds having the formula $M_N B_X O_Y.ZH_2O$, in which M=sodium, potassium, calcium, magnesium or ammonium, n=1 to 3, X=any whole number from 2 to 10, y=3x/2+1, z=0 to 14.

10. The composition of claim 9, wherein the boron source material is present in amount up to 20% by weight of the composition.

11. The composition of claim 6, in which a clarifier source material is present for water treatment.

12. The composition of claim 11, in which the clarifier source material is aluminum sulfate or sodium aluminum sulfate.

13. The composition of claim 12, wherein the aluminum sulfate or sodium aluminum sulfate source material is present in amount of up to 20% by weight of the composition.

14. A composition of matter for the treatment of a water system to inhibit growth of micro-organisms comprising sodium dipersulfate and as a catalyst a combination of 0.5 to 5% by weight based on the composition of copper sulfate or copper citrate and 2 to 10% by weight based on the composition of zinc sulfate to improve the oxidation properties of the sodium dipersulfate at ambient temperature.

* * * * *